(12) United States Patent
Meyer et al.

(10) Patent No.: US 6,919,973 B1
(45) Date of Patent: Jul. 19, 2005

(54) AUXILIARY PIXEL PATTERNS FOR IMPROVING PRINT QUALITY

(75) Inventors: Robert J. Meyer, Penfield, NY (US); Allen T. Retzlaff, Jr., Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/362,021

(22) Filed: Jul. 27, 1999

(51) Int. Cl.[7] .................. H04N 1/409; H04N 1/58; G06T 5/00
(52) U.S. Cl. .............. 358/3.26; 358/3.27; 358/532; 358/300; 382/275; 382/266
(58) Field of Search ............... 358/3.26, 532, 358/300, 1.9, 3.27, 296, 1.7, 534, 1.18; 382/308, 256, 257, 258, 266, 237, 269, 267

(56) References Cited

U.S. PATENT DOCUMENTS

| | | | |
|---|---|---|---|
| 3,784,397 A | 1/1974 | Sato et al. ............... 117/37 LE |
| 4,544,264 A | 10/1985 | Bassetti et al. ........... 355/14 R |
| 4,544,922 A | 10/1985 | Watanabe et al. .......... 340/728 |
| 4,625,222 A | 11/1986 | Bassetti et al. ............ 346/160 |
| 4,675,830 A | 6/1987 | Hawkins .................... 364/518 |
| 4,847,641 A | 7/1989 | Tung ........................... 346/154 |
| 4,868,600 A | 9/1989 | Hays et al. ................. 355/259 |
| 5,029,108 A | 7/1991 | Lung ........................... 364/519 |
| 5,184,226 A | 2/1993 | Cianciosi ..................... 258/296 |
| 5,193,008 A | 3/1993 | Frazier et al. .............. 358/298 |
| 5,299,308 A * | 3/1994 | Suzuki et al. ............... 345/501 |
| 5,459,828 A | 10/1995 | Zack et al. .................. 395/151 |
| 5,479,175 A | 12/1995 | Cianciosi et al. ........... 347/252 |
| 5,504,462 A | 4/1996 | Clanciosi et al. ........... 332/109 |
| 5,555,557 A * | 9/1996 | Mailloux ..................... 382/299 |
| 5,673,121 A | 9/1997 | Wang ........................... 358/456 |
| 5,706,046 A | 1/1998 | Eki et al. ..................... 347/252 |
| 5,740,330 A * | 4/1998 | Abe ............................. 358/1.2 |
| 5,774,167 A * | 6/1998 | Hara ........................... 347/254 |
| 5,818,504 A * | 10/1998 | Chung et al. ............... 347/251 |
| 5,835,123 A * | 11/1998 | Chung et al. ............... 347/251 |
| 6,038,039 A | 3/2000 | Zeng ........................... 358/447 |
| 6,177,948 B1 | 1/2001 | Estabrooks et al. ......... 347/129 |
| 6,181,438 B1 * | 1/2001 | Bracco et al. ............... 358/1.9 |
| 6,183,062 B1 * | 2/2001 | Curtis et al. ................. 347/41 |
| 6,270,186 B1 * | 8/2001 | Smith et al. ................. 358/1.9 |
| 6,290,330 B1 * | 9/2001 | Torpey et al. ................ 347/43 |
| 6,456,394 B1 * | 9/2002 | Gwaltney et al. ........... 358/1.9 |
| 6,606,470 B1 * | 8/2003 | Wibbels et al. ............. 399/156 |
| 2001/0012111 A1 * | 8/2001 | Awadalla et al. ........... 358/1.9 |

* cited by examiner

*Primary Examiner*—Scott A. Rogers
(74) *Attorney, Agent, or Firm*—Christopher D. Wait

(57) ABSTRACT

Utilization of non-printing high-spatial-frequency auxiliary pixels are introduced into the bitmap of an image to obtain local control of the image development by modification of local average voltage in the development nip. These auxiliary pixels embody frequencies or levels of charge that are past the threshold for printing on the Modulation Transfer Function (MTF) curve, and therefore by themselves result in no toner deposition on the resultant page. These auxiliary pixels will however, position the toner cloud by modulating it and to compensate for cleaning field and toner supply effects. This will better position the toner cloud to ensure adequate toner supply to all parts of the image so that the desired printing pixels will print as intended.

15 Claims, 10 Drawing Sheets

AUXILIARY PIXEL PATTERNS FOR IMPROVING PRINT QUALITY

RELATED CASES

Cross reference is made to the following applications filed concurrently and incorporated by reference herein: Ser. No. 09/362,022 entitled "Improved Digital Halftone With Auxiliary Pixels" by Robert J. Meyer and Allen T. Retzlaff, Jr., Ser. Nos. 10/707,572, 10/707,577 and 10/707,574 entitled "Improved Font Print Quality with Auxiliary Pixels" by Robert J. Meyer and Allen T. Retzlaff, Jr.

BACKGROUND OF THE INVENTION AND MATERIAL DISCLOSURE STATEMENT

The present invention relates to improving images produced by electrostatographic, electrophotographic or ionographic printers and reprographic copiers. More particularly, methods and apparatus are disclosed for solving the image problems of edge delineation and edge placement for shapes in an image. Such edge delineation and placement problems manifest as phenomena often referred to as line shrinkage, halo and white gap artifacts. These artifacts are also sometimes referred to as "slow toner".

Heretofore a number of patents have disclosed various approaches to the manipulation and enhancement of the edges of image shapes. The primary focus of the various approaches has been upon the line and edge smoothing of "jaggies" and other artifacts generated by digitization. A summary follows.

In U.S. Pat. No. 4,847,641 to Tung, print enhancement circuitry to enhance the printed image produced by a laser beam printer is interposed between the character generator circuits and the laser drive circuits to modify the laser drive signals provided by the character generator circuits. Bit data representing successive lines of the bit map for a desired image are stored in a first-in first-out (FIFO) buffer. The bit pattern sample window having a central cell (bit) and a selected (arbitrary) number of neighboring bits is compared to a number of matching bit patterns or templates, each of which is associated with an error element or cell. When a logic matching network detects a match, a modification signal associated with a unique compensation cell (bit) is generated. The sample window central bit is then replaced (modified) with the unique compensation bit required by the matching template. In this manner, all bits in a desired bit map, or set of bit maps, are examined and their corresponding laser drive signals modified to compensate for the errors associated with the matched templates in a piece-wise manner.

U.S. Pat. No. 4,544,264 to Bassetti et al. discloses an electrophotographic printing machine with circuits to enhance the printing of fine lines, such as lines of a single picture element (pel) in width. Provision is made for broadening such lines in one dimension by adding small "black" areas to each edge of the fine line in order to broaden it. In a second dimension, perpendicular to the first dimension, lines are broadened by placing gray pels next to black pels. The disclosure also discusses specific cases in which it may be considered desirable to inhibit the enhancement signals.

U.S. Pat. No. 5,029,108 to Lung discloses an edge enhancement method and apparatus for dot matrix devices wherein a group of gradient mask matrices are applied to a "current matrix", wherein a target pixel is surrounded by neighboring pixels, to determine if the target pixel is at a location where a change of brightness occurs. From this matrix operation, a conclusion is derived as to the existence or non-existence of an edge and the direction of the brightness change. The current matrix and a predetermined number of previously evaluated and yet to be evaluated pixels are then compared to a set of reference bit patterns which depict possible segment changes to be corrected. If the result indicates that the target pixel is on an edge of a changing edge segment, a corresponding code will be generated to modify the target pixel to enhance the smoothness of a segment transition. In the case of an electrophotographic printing machine, the specific code will change either the location or the size of the target pixel; whereas in the case of a monochrome screen display, the specific code will change the intensity of the target pixel.

In U.S. Pat. No. 4,544,922 to Watanabe et al., a desired character mainly composed of standard width dots selected from a matrix of orthogonally disposed rows and columns is displayed on a screen during scanning of the screen in horizontal and vertical directions. The display is smoothed by a circuit responsive to data stored in a memory. The smoothing involves the selected addition or removal, to or from particular portions of the character, of a small dot having a width one-third of the standard dot width.

U.S. Pat. No. 4,625,222 to Bassetti et al. discloses print enhancement circuits for an electrophotographic printing machine are placed between the character generator and the printhead to modify drive signals for the printhead. Modifications include smoothing the digitized edges of slanted lines; broadening single pel width lines in the direction perpendicular to the scan direction as well as in the direction parallel to scan. Inhibiting circuits are provided to prevent passage of enhancement signals under certain conditions. Generally, leading and trailing edge gray signals are provided next to all black data in a direction parallel to scan while expanded black signals are provided for the single pel data in a direction perpendicular to scan by adding to the black signal on both its leading and trailing edges. When a single picture element (pel) area contains two added black signals, both are passed; when a single pel area contains one added black signal and one gray signal, both are passed; when a single pel area contains two gray signals, only the leading gray signal is passed; and when a single pel area contains two added black signals and a gray signal, only the gray signal is passed.

The U.S. Pat. No. 5,479,175 to Cianciosi et al. is a an apparatus for enhancing the output along edges of discharged area developed regions in a tri-level imaging system employing a pulse width and position modulated signal ROS for exposure. The invention enables the identification and selective alteration of video data used to drive the ROS so as to extend the developed regions by a selected amount and eliminate digitization artifacts present in the image to be printed. The extension of the discharged area developed regions is accomplished by extending the width of, or adding separate, exposure pulses in adjacent areas to enable development within a portion of those regions.

In U.S. Pat. No. 5,193,008 to Frazier et al., the output of a conventional laser printer having a resolution of 300×300 dots per inch (dpi), and a predetermined threshold level for forming image dots, is enhanced by selectively providing interleaved image dots between the normal scan lines of the laser printer. Such interleaved image dots between scan lines may be achieved by appropriately energizing the two pixels directly above and directly below that desired interleaved dot, with the energizations at one or both pixels being selectively below the threshold level for producing a dot on the scan line, but with the combined energization at the desired interleaved point being above the threshold level to produce the desired interleaved dot. An input 600×600 bit map may be stored in a random access memory, and three vertically aligned bits from one main scan line and adjacent 600 dpi lines above and below are drawn from the RAM and are supplied to a logic and video output circuit which produces variable pulse width modulated pulses to the laser printer to produce the enhanced image.

U.S. Pat. No. 3,784,397 discloses a method for forming images by providing an electrostatographic imaging member bearing an electrostatic latent image on a recording surface. Then positioning the recording surface spaced from and facing a development electrode. This is followed with contacting the recording surface with toner particles whereby at least a portion of the toner particles deposit on the recording surface to form at least a partially imaged recording surface. Then maintaining the field strength of the development electrode as weak during the initial period of development and then increasing the field strength of the development electrode during the latter period of development, to form a substantially uniform developed image substantially free of streak, halo, edge effect, and background deposits.

In conventional xerography, electrostatic latent images are formed on a xerographic surface by first uniformly charging a photoreceptor. The photoreceptor is advanced to a development station where toner is attracted to the areas not discharged on the exposed charge retentive surface. In the development station there is a developer housing which is typically an inch or two (or more) long in the process direction. However, development doesn't occur throughout this length, but only over a restricted region. Typically this is a region where the photoreceptor belt or drum comes very close to the developer agent, whether it is a magnetic brush roll (which is roughly circular in cross section), or a donor roll. This area of closest approach or actual contact is called the nip. It is typically a few millimeters or so long (in the process direction). This is the region where all of the toner is actually transferred to the photoreceptor. Typically there is an air gap between the source of the toner and the photoreceptor.

A toner cloud is used to span the air gap between the source of toner and the photoreceptor surface. A method and apparatus for producing such a cloud of toner in an air gap between a toner donor and the photoreceptor is described in detail in U.S. Pat. No. 4,868,600, which is herein incorporated in its entirety by reference. Toner is detached from the toner donor and a powder cloud is generated by AC electric fields supplied by self-spaced electrode structures positioned within the development nip between the toner donor and the photoreceptor. The electrode structure is placed in close proximity to the toner donor within the gap between the toner donor and image receiver or photoreceptor. The toner cloud is used to span the gap between the source of toner and the photoreceptor surface as the photoreceptor passes through the development station. As through-put requirements drive the passing of the exposed photoreceptor surface though development station at ever greater speeds, this toner cloud is directed and modulated by the field charge pattern that results on the photoreceptor after exposure. Thus it is the speed and the presence of a gap that allows fringe fields in the latent image to strongly influence the deposition of toner. This is exacerbated in scavengeless systems where a cleaning field is utilized to repel toner from the photoreceptor.

The observed result of this toner cloud modulation is a propensity for depositing large amounts of toner where there is uninterrupted expanse of charged area (such as toward the middle of large image shapes), and to starve toner from locations where there is a strong or sudden change in charge (as found with narrow lines or shapes and on the edges of larger shapes). The result for thin lines and narrow shapes is line shrinkage. The effect on large shapes causes them to exhibit a defect called halo, which manifests itself most clearly at the interfaces of solid colors. Halo in color systems appears as white lines at interfaces which should otherwise be a perfect match between two colors. This defect is also observable in single color images as an edge distortion or displacement and line shrinkage dependent on the size of the printed object. Line shrinkage of course leads to poor line and text quality due to an erosion or shrinkage of the line edges and corners.

Therefore, there exists a need for techniques which will solve these halo and slow toner effects. Further, there exists a demand for increasing the throughput of printing and digital imaging systems without incurring or exacerbating these problems. Thus, it would be desirable to provide a means for satisfying such needs or demands by solving the aforesaid and other deficiencies and disadvantages.

SUMMARY OF THE INVENTION

The present invention relates to auxiliary pixels which do not print, either singly or in combination but aid in the satisfactory printing of the image and to the placing of auxiliary pixels within an image.

In accordance with the present invention, there is provided a digital imaging system which receives and processes a document image, in an image processing system or digital front end. This is done so as to embed auxiliary pixels in the document image and thereby improve the rendition of the document image.

More particularly, the present invention relates to a method of morphologically manipulating image data. The morphological sequence being to first store the source image in a first memory space. Then replicating that stored source image as a working image in a new memory space. Followed by dilating the working image and, then outlining that result. This will produce outline pixels as a second resultant working image. The outline pixels are then substituted for auxiliary pixels. Finally, an OR operation is performed of the outline pixel pattern of auxiliary pixels, with the original source image as stored in memory, to thus produce auxiliary pixels in the source image at those pixel locations corresponding to the outline data in the second resultant working image.

DESCRIPTION OF THE INVENTION

Figure 1:
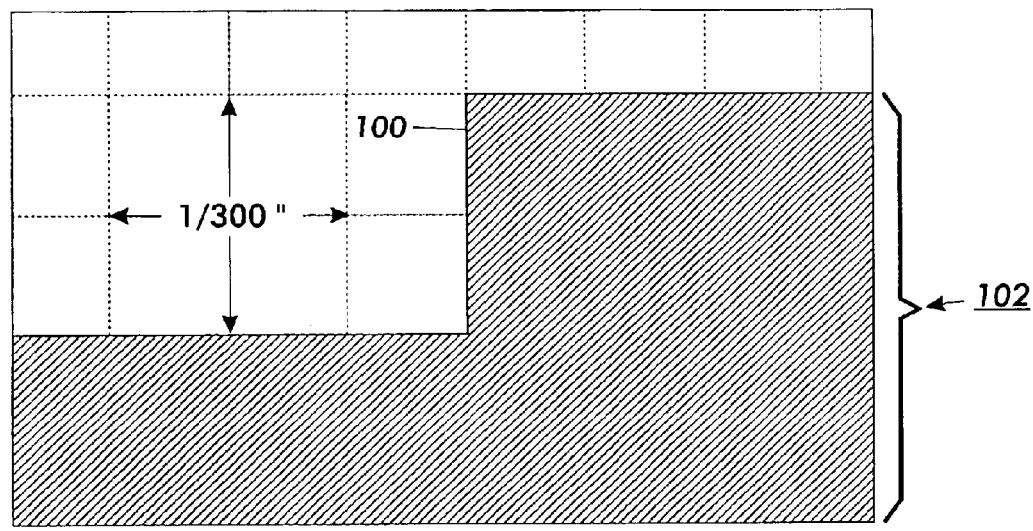
FIG. 1 is part of a line, hypothetically rendered at 300× 300 dpi.

For a general understanding of the present invention, reference is made to the drawings. In the drawings, like reference numerals have been used throughout to designate identical elements. In describing the present invention, the following term(s) have been used in the description.

An "image" is a pattern of physical light. It is understood that an image may be further comprised of shapes. An image as such, may include characters, words, and text as well as other features such as graphics. An image may be divided into "segments" or "regions", each of which is itself an image. A region of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." A "pixel" is the smallest segment of an image whose value is indicated in an item of data defining the image. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color form" of an image, the binary form, gray scale form, and color form each being a two-dimensional array defining an image.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

A "version" of a first image is a second image produced using an item of data defining the first image. The second image may be identical to the first image, or it may be modified, such as by image processing operations.

An "image input terminal" (IIT) is a device that can receive an image and provide an item of data defining a version of the image. A "scanner" is an image input device that receives an image by a scanning operation, such as by scanning a hardcopy document. An "image output terminal" (IOT) is a device that can receive an item of data defining an image and provide the image as a visual output. A "xerographic marking engine" is an image output device that provides the output image in hardcopy document form.

A "lead edge deletion" is an image defect which occurs on the leading or first-printing edge of a solid area. It is an edge displacement in a direction opposite to the process motion of the deposited toner as with respect to the lead edge of the latent electrostatic image pattern on the photoreceptor.

An operation performs "image processing" when it operates on an item of data that relates to part of an image. A "morphological" or "logic-based" operation operates using logical operators (e.g., AND, OR, INV, NOT) applied to a digital image. In particular, the logic operations are typically applied in association with a "structuring element" such as an aperture having a predefined shape or other set of characteristics.

A number of morphological operations map a source image onto an equally sized destination image according to a rule defined by a pixel pattern called a structuring element (SE). The SE is defined by a center location and a number of pixel locations, each having a defined value (ON or OFF for the binary case, with Grey-scale morphology all intermediate levels are allowed). The pixels defining the SE do not have to be adjacent each other. The center location need not be at the geometrical center of the pattern; indeed it need not even be inside the pattern.

"Erosion" is a morphological operation wherein a given pixel in the destination image is turned ON if and only if the result of superimposing the SE center on the corresponding pixel location in the source image results in a match between all ON pixels in the SE and On pixels in the underlying pixels in the source image.

"Dilation" is a morphological operation wherein a given pixel in the source image being ON causes the SE to be written into the destination image with the SE center at the corresponding location in the destination image.

Turning to FIG. 1, depicted is a region of an image as at a diagonal edge 100 on an image shape 102. For this image in the original data a pixel is 300 by 300 dots per inch (dpi). At that resolution diagonals will exhibit distinct jagged stair-case transitions in the edge 100 of the image shape 102.

Figure 2:
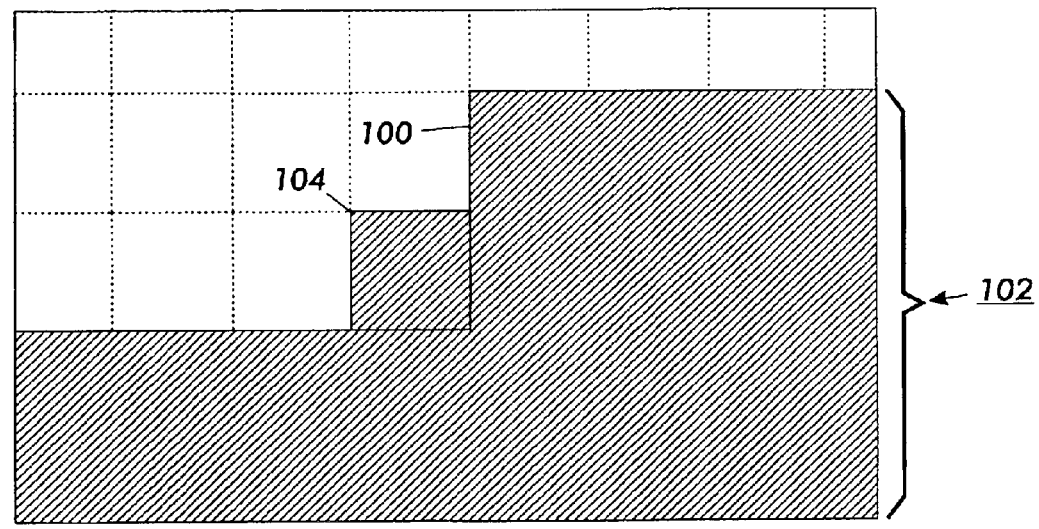
FIG. 2 the line from FIG. 1 smoothed by templates and rendered at 600×600 dpi.

FIG. 2 shows a possible result to the data in FIG. 1 after expansion to 600×600 dpi by means of pattern matching templates and application of Resolution Enhancement Technology (RET). RET is a technique used in various Hewlett Packard and Xerox printers. It smoothes out the jagged stair-case transition resulting from digitization by inserting an added pixel 104. This new added pixel is at the higher dpi resolution.

Figure 3:
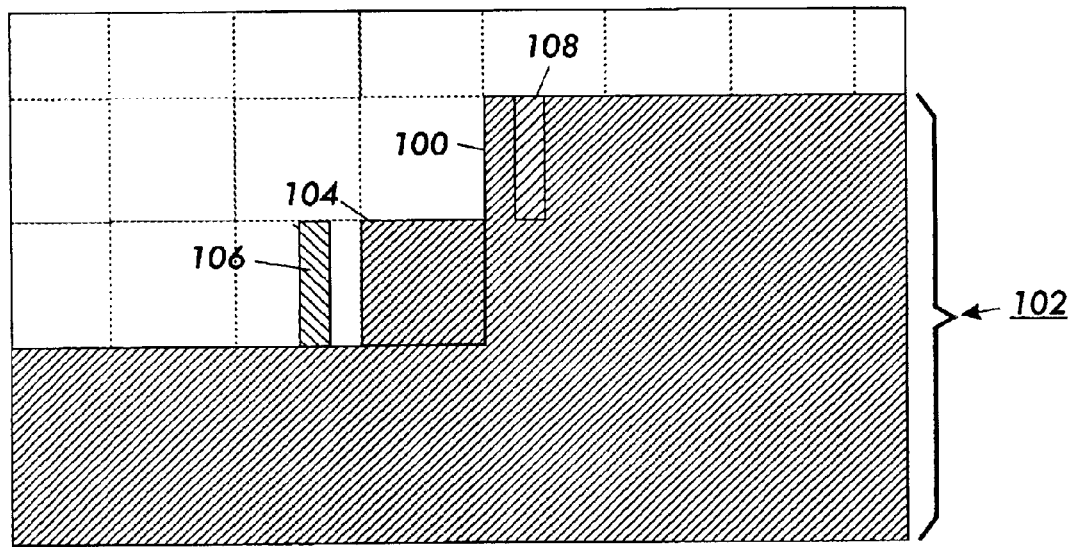
FIG. 3 the line from FIG. 2 with non-printing auxiliary dots.

In FIG. 3 there is an example of the present invention as applied to the data found in FIG. 2. The RET generated added pixel 104 is retained. However, ultra fine pixels herein referred to as "non-printing" pixels, or "auxiliary" pixels as substituted into the bitmap, have been placed close to the edge of, but both interior and exterior to the image shape. A "black" type of non-printing auxiliary pixel 106 is placed exterior to the image shape and a "white" type of non-printing auxiliary pixel 108 is placed interior to the image shape. It should be noted that the RET generated pixel 104 was retained in FIG. 3 for illustrative purposes only, it is not required for the present invention and in a preferred embodiment may in fact be replaced by a suitable auxiliary pixel. The auxiliary pixels 106 & 108 (and patterns of them in a preferred embodiment) are used to modulate the toner cloud density and distance from the photoreceptor during development.

These auxiliary pixels 106 & 108 may be above the frequency for printing on the MTF curve or they may be of sub-critical density, that is below the normal density threshold for printout in their respective regions so that they are non-printing in effect. This may be achieved typically in two ways; first in a laser based system for example, the laser may be modulated in a manner such that the laser intensity is so reduced that the auxiliary pixel location is substantially under-exposed. As a result, much more charge is retained on the photoreceptor at that location than there would be for a normal fully developed pixel at that location. Second, in the alternative or in combination with laser intensity modulation, the pulse width may be modulated to such a high frequency and thereby down to such a small size that no toner (or an insufficient amount of toner to survive transfer to a substrate) adheres to the photoreceptor sufficient to allow printing. A pulse width and position modulator (PWPM) may be used in a preferred embodiment to accomplish this. PWPM techniques are well known in the art. U.S. Pat. No. 5,184,226 and U.S. Pat. No. 5,504,462, which are both incorporated by reference herein for their teaching, provide exemplary examples.

The addition of such small non-printing pixels to a digital image will move the toner cloud toward or away from the photoreceptor in the neighborhood of an area to be developed. The auxiliary pixels may be either 106 "black" or "on" pixels in an otherwise "off" area, or 108 "white" (that is, "off" pixels in an otherwise "on" area). Depending on the system needs, the actual laser intensity or MTF frequency may be the same for both the "white" 108 and "black" 106 auxiliary pixel. In that case there is really only a single type of auxiliary pixel placed both within and without the image shape. When two types of auxiliary pixel are employed, their density or frequency is different but they are still always non-printing in and of themselves, whether employed singly or adjacently clumped together in an group of auxiliary pixels. By that we mean that all pixel locations that are originally "on" in the bit map will still print as black, regardless that an auxiliary pixel has been substituted at that location. All pixel locations that are "off" will also still not print, regardless that an auxiliary pixel has been substituted at that location. So while a 108 "white" auxiliary pixel taken and placed in isolation might actually print, when used as per the invention and substituted in an "on" printing area, there is no effective change relative to the intended input image bitmap. Thus it is non-printing in effect in and of itself, even when used in a clustered combination or directly adjacent any number of other auxiliary pixels.

The auxiliary pixels will produce small attractively biased or reversed biased areas on the photoreceptor. The attractively biased 106 areas will not develop toner on the photoreceptor, or develop so little, that it will not appear in the final print, because they are beyond the critical frequency on the development (or transfer) MTF. What they will do however, is encourage a toner cloud close enough to the photoreceptor to mitigate the spreading effect of the surrounding cleaning field. Of course, a corresponding statement in the alternate is true for the reverse biased areas 108; they will discourage or repel toner away from the photoreceptor. Thus, auxiliary pixels will have a printing effect upon original pixels which they neighbor. The result is that the development cloud (or a development brush) will not be repelled as much from surrounding white areas due to "black" non-printing auxiliary pixels 106, and the development field will not be so strong near the sharp edges, due to non-printing "white" auxiliary pixels 108. In this way auxiliary pixels will enhance the printing of original pixels in a manner as intended by the original bit map by mitigating the edge displacement and halo problems endemic to increased printing system speed and throughput. Numerous options exist for placement of non-printing pixels to use this effect.

Figure 4:
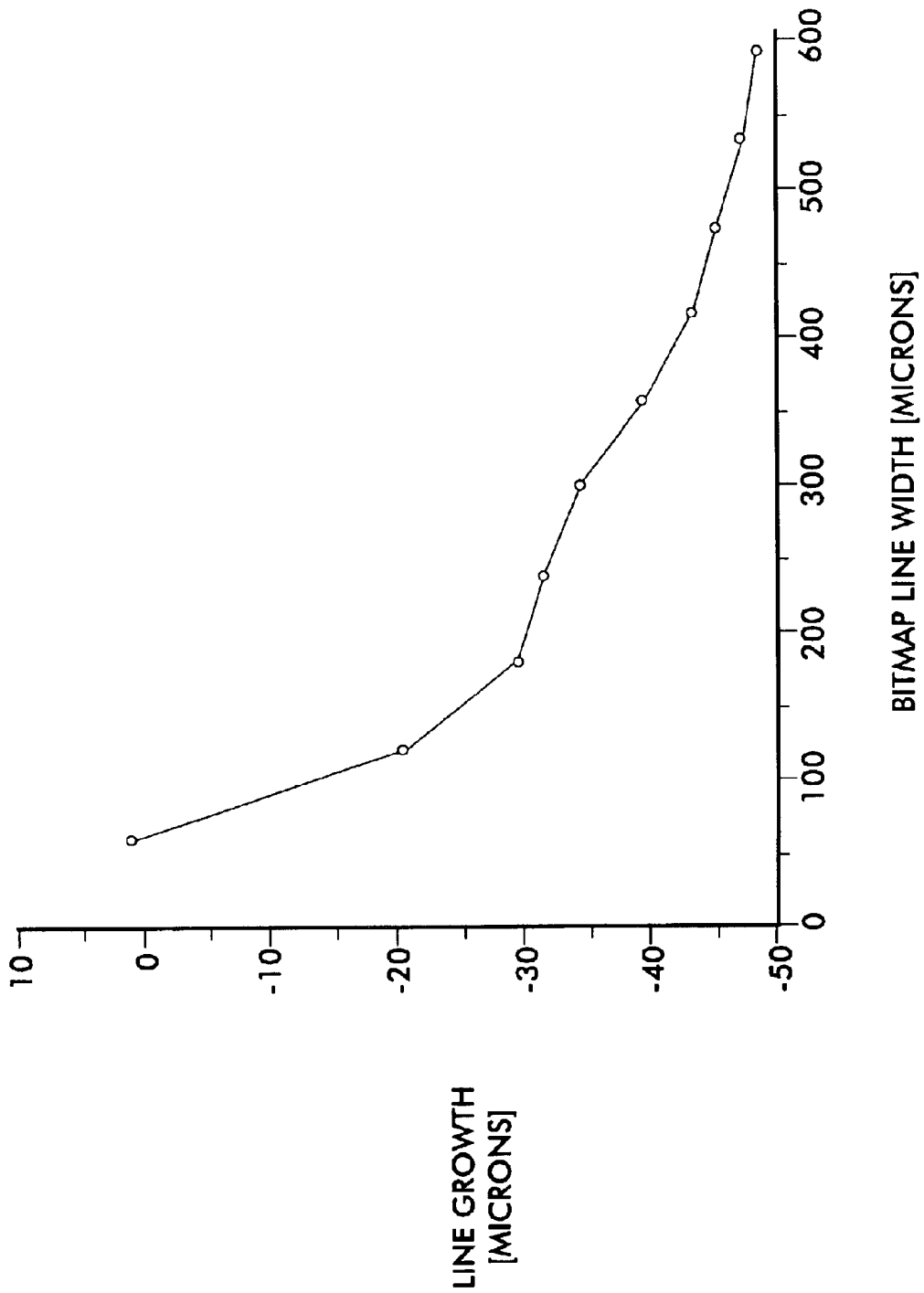
FIG. 4 is a graph of empirically observed line growth for parallel positive lines.

FIG. 4 depicts the experimentally observed negative line growth found with parallel positive lines. This data substantiates the progressive line narrowing for positive (that is, black on white background) parallel lines. The wider the line, the greater the amount of line shrinkage. There are two effects in operation here causing the negative line growth. First, the MTF of the cleaning field spreads the white background area across the black line, thus displacing the edge inward. Second, the strong demand for toner in the middle of the line "recruits" toner from the edge of the line, thus further reducing supply at the edge. In order to control line growth, the invention proposes inserting non-printing black auxiliary pixels 106 around the line and non printing white pixels 108 within the line.

Figure 5:
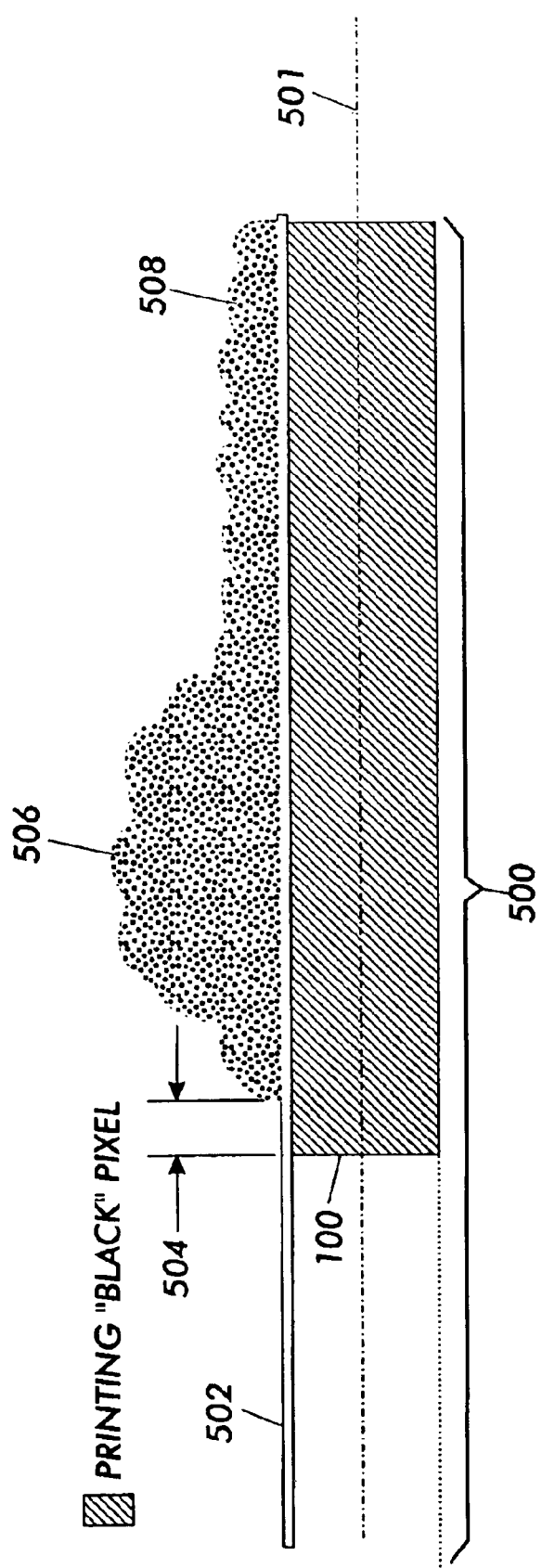
FIG. 5 is a sectional, elevational view taken through an intended bit map for a large shape in the image at its edge depicting the deposited toner resulting on the photoreceptor.

In FIG. 5 we have depicted a bitmap slice 500 of a pixel pattern for a solid shape at it's edge. Cross-sectioning through the bitmap slice 500 at line 501, and looking at the photoreceptor 502 as on edge at that location corresponding to the bitmap slice 500 data, display is made of a typical resulting toner accumulation as found on a photoreceptor 502. There we can see lead edge deletion by the edge displacement 504 of the toner from the intended edge 100. Also note toner excess buildup 506 as in contrast to an area of desired toner coating 508.

The origin of edge displacement 504 and the resulting lead edge deletion image defect is best understood in terms of the physics of the toner cloud development process. When a toner cloud developer subsystem is not printing, the toner cloud is repelled from the photoreceptor by a cleaning field. When the latent image on the photoreceptor changes from background (i.e., no developed toner) to image (developed toner desired), the directions of the fields in the space above the photoreceptor change directions, from a repelling or cleaning field to an attractive or developing field. This is accompanied by the usual fringe field effects. Since the toner cloud is initially some distance from the photoreceptor, there is a finite time that it takes the cloud to respond to the field and reach the photoreceptor. This cloud motion time depends on the tribo of the toner in the cloud and the development field strength. During this finite time no toner is being developed on the latent image, and the lead edge deletion results. The length of the lead edge deletion (edge displacement 504) on the image then increases as the product of this cloud motion time, and the speed of the photoreceptor with respect to the developer housing. Thus, the lead edge deletion problem becomes worse as the process speed increases.

Figure 6:
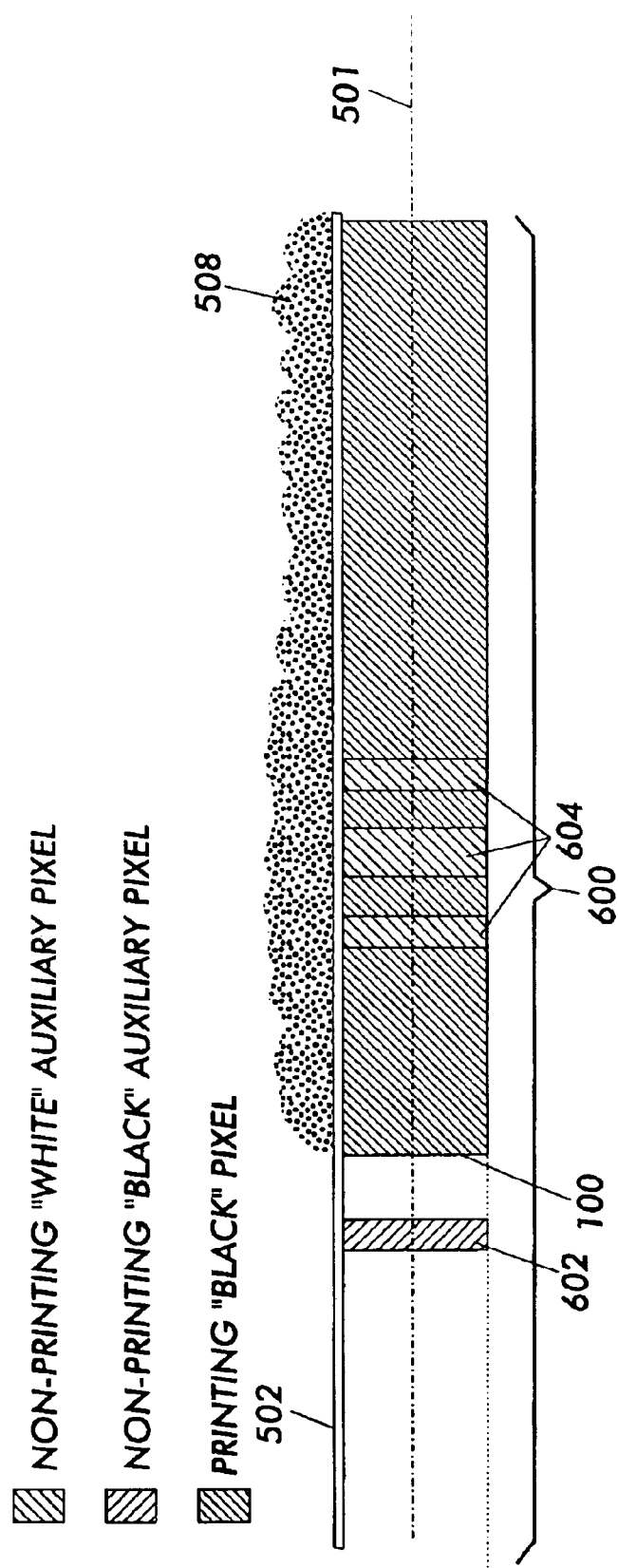
FIG. 6 is a sectional, elevational view and bit map of the shape depicted in FIG. 5 with the addition of auxiliary pixels.

With FIG. 6 the input data of FIG. 5 is rendered with the insertion of auxiliary pixels in a manner exemplary of a preferred embodiment of the present invention. The bitmap slice 600 comprises the input data of bitmap slice 500 with the addition of non-printing "black" pixels 602 and non-printing "White" pixels 604. Again photoreceptor 502 is displayed on edge at the location corresponding to the cross-section line 601 through bitmap slice 600. This shows how a preferred embodiment of auxiliary pixels yields an even coating of toner 508 in all intended areas, and the absence of any edge displacement 504 from the intended edge 100.

There is a corresponding image defect on the trailing edge of solid area images, image drag-out. In this case, the edge displacement corresponds to toner moved into the background area which should remain with-out toner. This results both from Coulomb repulsion between charged toner particles, and from fringe field effects. Image drag-out is more endemic to liquid development systems, and is minimized by the use of "white" auxiliary pixels 604 dispersed within the solid image near the trailing edge. This has the purpose of decreasing the amount of toner deposited along this trailing edge. As the height of the toner pile 506 near this trail edge decreases, the lateral fringe fields forcing toner into the neighboring background area decreases.

Figure 7:
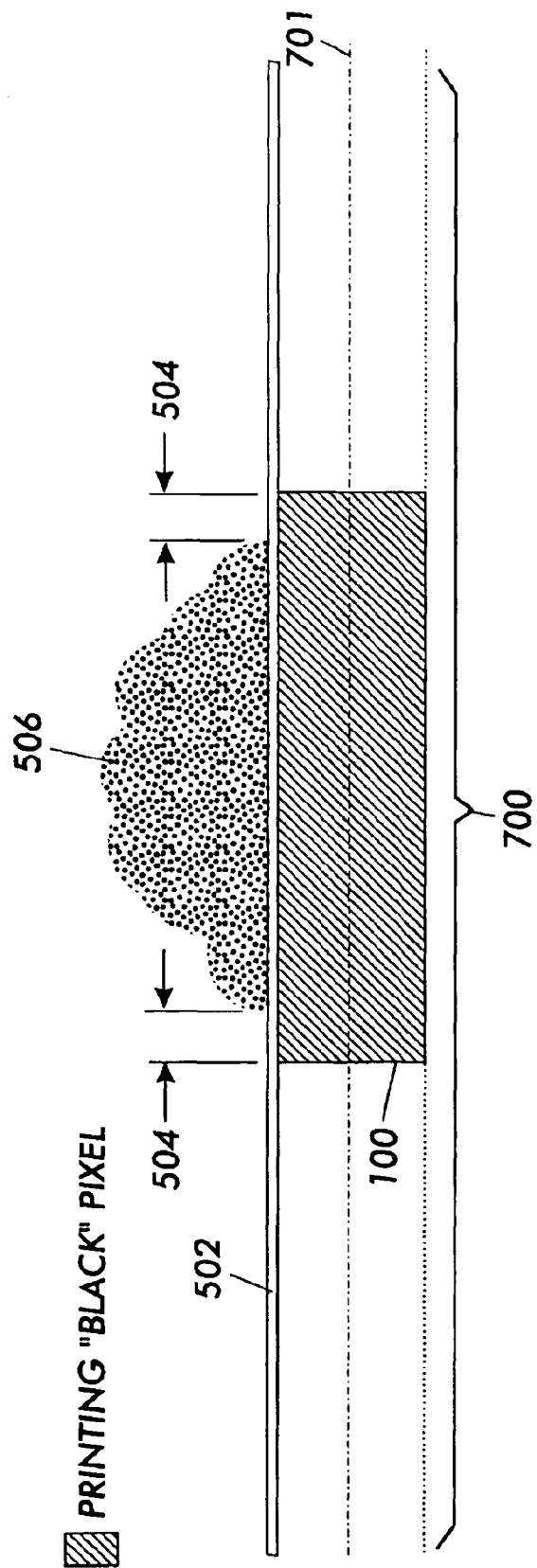
FIG. 7 is a sectional, elevational view taken through an intended bit map for a line in the image depicting the deposited toner resulting on the photoreceptor.

FIG. 7 presents a similar situation as depicted in FIG. 5. However, the image data portrayed is for a line rather than a solid shape taken at its edge. Cross-sectioning through the bitmap slice 700 at line 701, and looking at the photoreceptor 502 as on edge at that location corresponding to the bitmap slice. 700 data, display is made of a typical resulting toner accumulation as found on a photoreceptor 502. There we can see the edge displacement 504 of the toner from the intended edge 100, and toner excess buildup 506.

Figure 8:
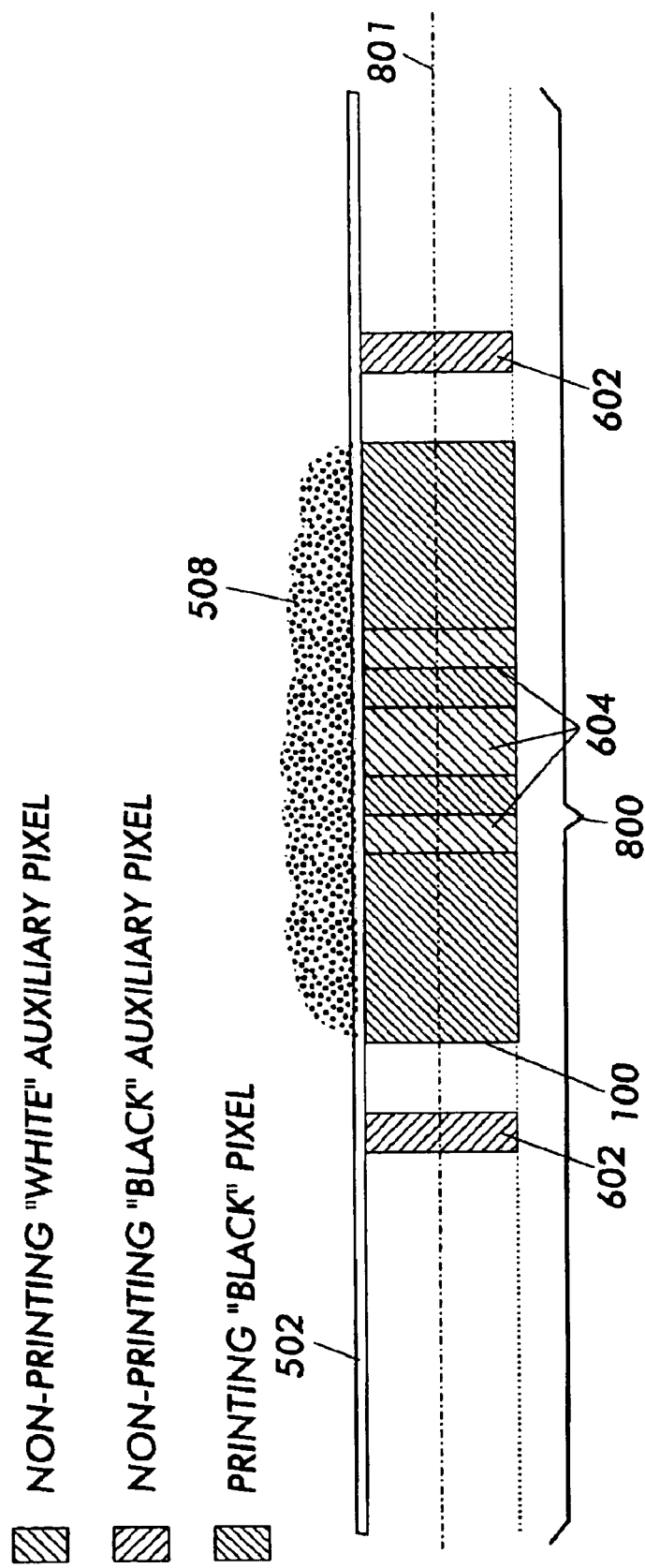
FIG. 8 is a sectional, elevational view and bit map of the line depicted in FIG. 7 with the addition of auxiliary pixels.

In FIG. 8 the input data of FIG. 7 is rendered with the insertion of auxiliary pixels in a manner exemplary of a preferred embodiment of the present invention. The bitmap slice 800 comprises the input data of bitmap slice 700 with the addition of non-printing "black" pixels 602 and non-printing "white" pixels 604. Again, photoreceptor 502 is displayed on edge at the location corresponding to the cross-section line 801 through bitmap slice 800. This suggests how a preferred embodiment of auxiliary pixels yields an even coating of toner 508 in all intended areas, and negates any edge displacement effects relative to the intended edge 100.

There are two actions associated with negative line growth to be overcome. First, the MTF of the cleaning field spreads the white background area across the black line, thus displacing the edge inward. Second, the strong demand for toner in the middle of the line recruits toner from the edge of the line, thus further reducing the supply at the edge. The positive "black" auxiliary pixels 602 diminish the cleaning field, while the "white" auxiliary pixels 604 reduce demand in the middle of line. Since there is less toner deposited in the middle of the line, it is now available for development at the edge, and thus the line will be widened. This widening occurs at the cost of optical density in the middle of the line, which will be small, and the marginal increase in optical density with respect to DMA (developed mass per unit area) is less than at lower DMAs.

Figure 9:
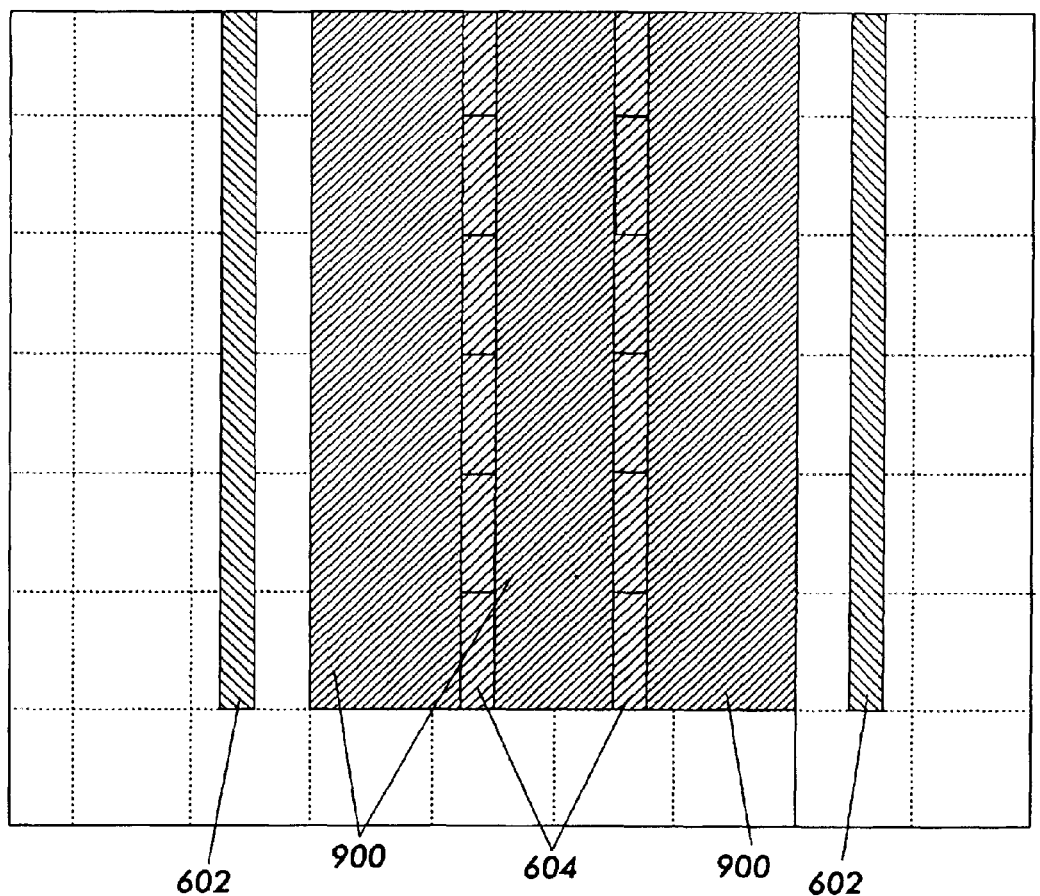
FIG. 9 is an auxiliary pixel pattern to control negative line growth in parallel lines.

FIG. 9 is provided as an alternative example and preferred embodiment, of auxiliary pixels applied as a pattern to an image line shape data. Non-printing "black" auxiliary pixels 602 are provided outside of the desired line data 900, though in close proximity to that line 900, and non-printing "White" auxiliary pixels 604 are substituted within the line 900 data. While non-printing "black" auxiliary pixels 602 are in this embodiment, only in close proximity to the edge, there may be situations in various systems where the auxiliary pixel is best placed directly adjacent to the edge of a shape or at some other distance or pattern from the shape edge. Further, while here in FIG. 9 the non-printing "black" auxiliary pixels 602 are arranged adjacent to one another, in another embodiment, only every other pixel location may receive an auxiliary pixel in a skip pattern fashion along the edge of the desired image shape.

Image morphology is utilized to accomplish the addition or placement of auxiliary pixels into the input data of an original image. For a preferred example of an auxiliary pixel pattern as found in FIG. 9, a morphological dilation followed by a morphological outlining operation will create the bitmap of pixel locations for the placement of the "black" auxiliary pixels. The "white" auxiliary pixel locations in FIG. 9 are determined by performing a morphological erosion followed by a morphological outlining operation. The morphological dilation and erosion are of from one to two pixels in operation, so as to realize a result like that found in FIG. 9. Such morphological operations are well understood by those skilled in the art.

For example, a morphological outlining operation is essentially an erosion operation where the objects in the image data are shrunk by one pixel around their perimeter. Use is then made of a dual-image point process to subtract the eroded image from the original image. This is the same as performing a Boolean NOT operation upon the original data with the eroded image. The result is an image showing only the outline of the objects.

In an alternative embodiment, a diffuse pattern or array of auxiliary pixels as clustered about the edge of a shape is preferred. This pattern is typically a dispersed or dispersing patter. Clusters of auxiliary pixels are grouped around the edge of image areas most likely to be starved for toner or where it's anticipated slow toner problems may occur. This is most typically in areas of fine image detail or where there are narrow lines, but also includes the edges of larger image shapes when halo problems are to be anticipated. In accommodation of large image shapes where toner pileup may occur, particularly near the shape periphery, auxiliary pixels may be placed within the image shape to reduce any toner pileup as well. This is most appropriate in anticipation of toner shrinkage problems, where the greater the mass of toner, the greater the amount of edge shrinkage and resulting halo to be expected. The "clusters" comprise diffuse patterns or arrays of auxiliary pixels, so called because of the tight arrangement of the auxiliary pixels as clustered about their respective shapes and lines. The exact pattern will vary from printing system to printing system and must be determined either empirically or by simulation. In a preferred embodiment, the pattern of auxiliary pixels is disperse but typically located in close proximity to an image edge. Examples of preferred pattern clusters are presented in FIGS. 10 and 11. At all times, the auxiliary pixels are non-printing in effect themselves, either singly or clustered in any pattern or combination. Auxiliary pixels are simply an adjunct to the original image pixels as found within an original image bitmap. Though substituted within an image for select original pixels they never cause a change to the image pattern from the intended original bitmap other than to more faithfully render that intended original bitmap.

Figure 10:
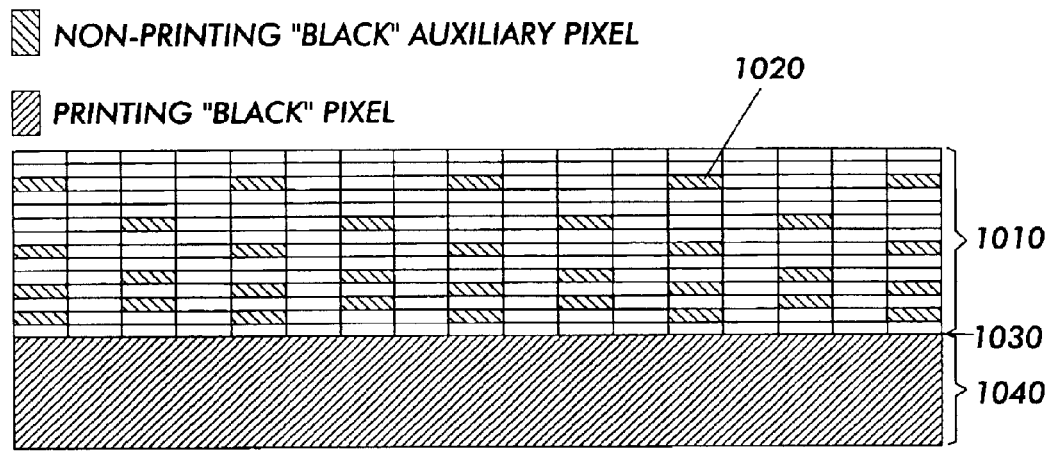
FIG. 10 is an auxiliary pixel pattern to control negative line growth in parallel lines and halo effects for image shapes.
Figure 11:
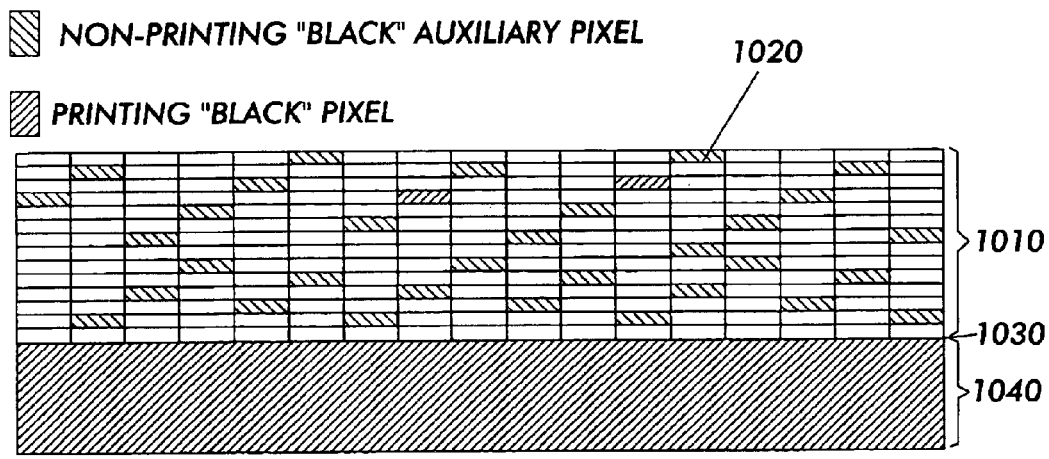
FIG. 11 is an alternative auxiliary pixel pattern cluster for controlling the negative line growth and halo effects of an image shape.

As explained above, the length of the lead edge deletion, as identified by edge displacement 504, is minimized by pre-positioning the toner cloud close to the photoreceptor through the use of auxiliary pixels. Just how far in advance of an image edge this pre-positioning should be performed by the placement of auxiliary pixels is dependent upon the particulars of a given printing system. The faster the system through-put, the more in advance the pre-positioning needs to be. The above preferred embodiment anticipates usage with more typical present day printing and copying systems. However for higher speed systems, clustered or diffuse array arrangements of auxiliary pixels are anticipated. In such high speed systems, a preferred limiting density would correspond to one pixel on, one pixel off, one pixel on, etc. in a checkerboard pattern. This auxiliary pixel pattern would pre-position the cloud as close to the photoreceptor as possible without printing. Remember, as the cloud distance from the photoreceptor decreases, the length of the lead edge deletion decreases. But, as the system speed increases, the lead edge deletion increases. In anticipation of such high speed systems, FIGS. 10 and 11 depict appropriate further preferred embodiments, where a diffuse array 1010 of non-printing attractive (black) auxiliary pixels 1020 is employed. The array is clustered in front of the leading edge 1030 of a solid area 1040 in the bitmap so as to effectuate manipulation of charge in the latent image in a more gradual and anticipatory manner. Since the toner cloud is subjected the attractive field from these pixels 1020, it will move closer to the photoreceptor. The denser the array of auxiliary pixels 1020, the closer the cloud moves toward the photoreceptor.

Figure 12:
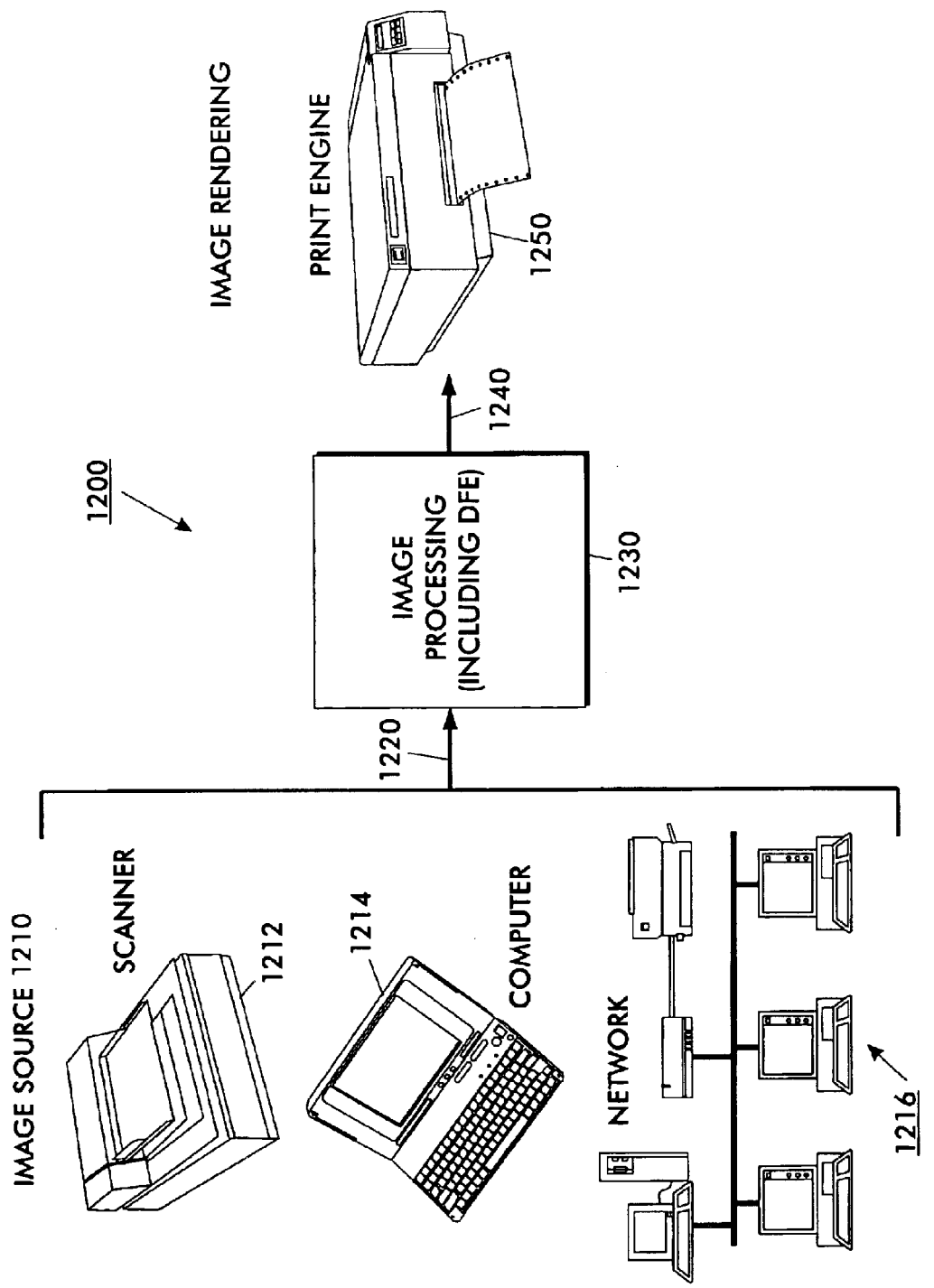
FIG. 12 is a general representation of a suitable system-level embodiment for the invention.

Turning now to FIG. 12, there is shown an embodiment of a digital imaging system 1200 that incorporates the features of the present invention. Digital imaging system 1200 includes image source 1210 that may include scanner 1212, computer 1214, network 1216 or any similar or equivalent image input terminal (IIT) to generate original input image data 1220. Image data 1220, representing an image to be printed, is supplied to an image processing system 1230, that may incorporate what is known in the art as a digital front end (DFE). Image processing system 1230 process the received original image data 1220 to produce print ready binary data 1240 that is supplied to print engine 1250. In response to print ready data 1240, print engine 1250 generates an output document or print image on suitable media. Print engine 1250 is preferably a electrostatographic or electrophotographic engine; however, engine 1250 may include an equivalent alternative, for example ionographic. The present invention is directed towards aspects of image processing system 1230 depicted in FIG. 12. In particular, the present invention is directed to embedding auxiliary pixels into image data 1220.

There are a variety of approaches apparent to those skilled in the art that may be taken in image processing system 1230 for processing received original image data 1220 so as to produce binary data 1240 with embedded auxiliary pixels. It will also be appreciated by those skilled in the art that the exact type and pattern of auxiliary pixel utilized will vary depending upon the particulars of print engine 1250. A preferred approach comprises essentially the steps of storing the incoming data 1220 in a buffer or memory; replicating or copying incoming data 1220 in a memory work space; performing a dilation upon the work space data followed by; a morphological outline to that result, then; substituting the appropriate auxiliary pixel for all "on" pixels in the outline data as contained in the work space, and; finally performing a morphological Boolean OR operation of that work space result upon the original incoming data 1220 as stored in a buffer memory (or upon a copy of the original incoming data 1220). By changing the dilation operation referred to above for an erosion and substituting the appropriate auxiliary pixel type, "white" auxiliary pixels may be embedded.

Thus by introducing non-printing auxiliary pixels into the bitmap of an image, local control of the image development is obtained by modification of local average voltage in the development nip. Using auxiliary pixels positions the toner cloud by modulating it and may also compensate for cleaning field and toner supply effects. Auxiliary pixels in combination with the methods and apparatus discussed above can better position the toner cloud and ensure adequate toner supply to all parts of the image so that the desired printing pixels will print as intended and in this way overcome edge displacement, image halo, and slow toner problems.

While the embodiment disclosed herein is preferred, it will be appreciated from this teaching that other variations or examples may be made by those skilled in the art. For example other embodiments would include: ionographic systems; brush roller toner delivery systems; and CEP—Contact Electrostatic Printing or similar charged cake toner delivery systems. However, these examples are not exhaustive, nor is there any intent to exclude various alternative, modifications, variations or improvements therein from being encompassed by the following claims.

What is claimed:

1. An improved print image, comprising:

an original image of original pixels further comprising at least one shape having at least one edge; and, black auxiliary pixels, where the black auxiliary pixels are substituted into the original image spaced at least one pixel distant from the at least one edge and exterior of the at least one shape for said original pixels so as to mitigate edge displacement or halo problems in the printing of the original image.

2. The improved print image of claim 1, wherein the black auxiliary pixels substituted into the original image spaced at least one pixel distant from the at least one edge and exterior of the at least one shape for said original pixels, are provided as a pattern of black auxiliary pixels.

3. The improved print image of claim 1, the black auxiliary pixels being equally distant from the at least one edge.

4. The improved print image of claim 3, wherein the black auxiliary pixels are at least two pixels distant from the at least one edge.

5. The improved print image of claim 1, wherein a pattern of black auxiliary pixels is substituted for a corresponding pattern of original pixels in the original image.

6. The improved print image of claim 5, wherein the pattern of black auxiliary pixels is clustered about a shape edge found in the original image.

7. The improved print image of claim 6, wherein the clustered black auxiliary pixels are in a checkerboard pattern.

8. The improved print image of claim 5, wherein the pattern of auxliary black pixels is a dispersed array close to the at least one edge.

9. A method for improving the printing of an image, said method including:

receiving a source image of original pixel data further comprising at least one shape having at least one edge; and, processing the source image original pixel data to embed black auxiliary pixels spaced at least one pixel distant from the at least one edge and exterior of the at least one shape for said original pixel data to mitigate edge displacement or halo problems in the printing of the source image.

10. The method for improving the printing of an image of claim 9, wherein the processing involves morphologically manipulating the original pixel data for embedding the black auxiliary pixels for original data pixels.

11. The method for improving the printing of an image of claim 10, wherein morphologically manipulating comprises:

storing the source image in a first memory space;

replicating the source image as a working image in a second memory space;

dilating the working image to produce a first resultant working image;

outlining the first resultant working image to produce outline pixels in a second resultant working image;

substituting auxiliary pixels for the outline pixels in the second resultant working image; and, performing an OR operation of the second resultant working image with the source image in the first memory space, to thus produce auxiliary pixels in the source image at those pixel locations corresponding to the outline data in the second resultant working image.

12. In a digital imaging system receiving document images, a method for optimizing a rendition thereof, comprising:

receiving a document image representation in a form suitable for processing the document image further comprising at least one shape having at least one edge; and, processing the document image in an image processing system to embed black auxiliary pixels spaced at least one pixel from the at least one edge and exterior of the at least one shape therein in order to improve the rendition of such document image.

13. The digital imaging system of claim 12, wherein the image processing system includes, a digital front end.

14. The digital imaging system of claim 12, wherein the processing includes morphologically manipulating the document image.

15. The digital imaging system of claim 14, wherein morphological manipulation comprises:

storing the document image in a first memory space;

replicating the document image as a working image in a second memory space;

dilating the working image to produce a first resultant working image;

outlining the first resultant working image to produce outline pixels in a second resultant working image;

substituting auxiliary pixels for the outline pixels in the second resultant working image; and, performing an OR operation of the second resultant working image with the document image in the first memory space, to thus produce auxiliary pixels in the stored document image at those pixel locations corresponding to the outline data in the second resultant working image.

* * * * *